Patented Aug. 25, 1953

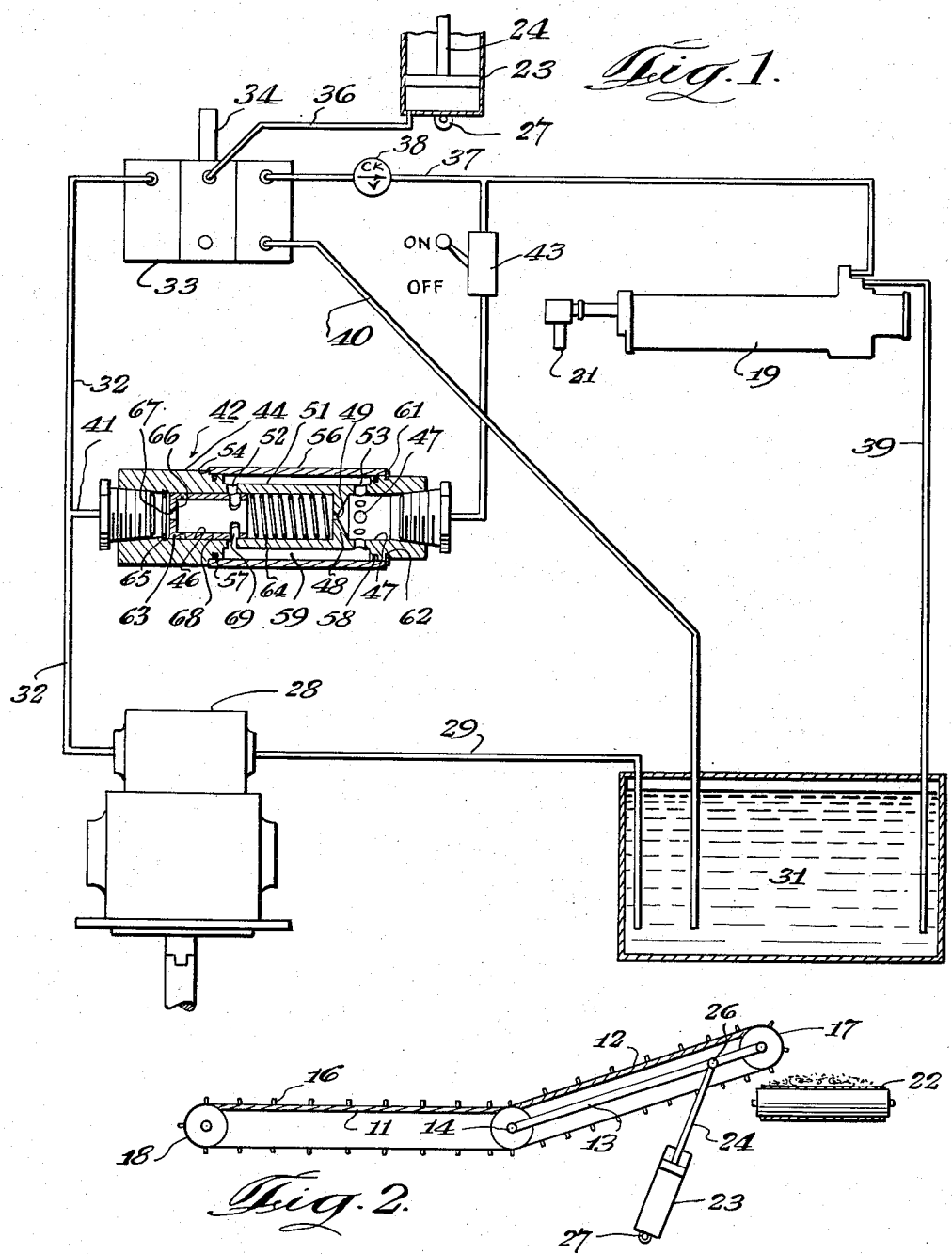

2,649,980

UNITED STATES PATENT OFFICE 2,649,980

MINE HAULAGE VEHICLE

Joseph J. Slomer, Chicago, Ill., assignor to Goodman Manufacturing Company, Chicago, Ill., a corporation of Illinois Application April 25, 1951, Serial No. 222,749

8 Claims. (Cl. 214—83.36)

This invention relates generally to mine haulage vehicles and relates particularly to apparatus for controlling the discharging and steering movement thereof.

Coal mine haulage vehicles have heretofore been employed for transporting coal from the working face to the entry where the contents are discharged onto cars or a conveyor belt at a discharge station. Such vehicles are provided with hydraulic power assisted steering apparatus and hydraulically operated discharge sections which are enabled to be raised into position over a discharge chute or the like at the discharge station. The hydraulic systems for such vehicles are generally only sufficient to provide pressure fluid for either steering or operating the discharge section, and when the vehicle is being spotted in proper position at the discharge station there is no provision whereby simultaneous operation may be had of both the discharge section and the steering booster to aid in locating the car properly in position for discharge.

According to the present invention, the entire output of the hydraulic system is made available for power assisted steering in tramming from the working face to the discharge station and for completing the elevating movement of the discharge section once the vehicle is in position at the discharge station, and also for proportioning the pressure fluid between the power assisted steering apparatus and the elevating discharge section while the vehicle is being spotted in proper position for discharge. In carrying out the invention a hydraulic pump is connected to a valve controlling both the flow of pressure fluid to the elevating discharge section and the power booster for the steering apparatus. Ordinarily, the control valve is so arranged that pressure fluid is passed therethrough for operation of the steering booster, but when the discharge section is elevated, the demand for pressure fluid by the fluid motor for elevating the discharge section results in insufficient fluid at proper pressure to operate the steering booster, but under conditions when both steering and elevation of the discharge section are required, the pressure fluid is proportioned between the steering booster and the fluid motor operating the discharge section. An auxiliary valve is provided which enables the pressure fluid to take a branching path past a flow regulating device which insures that sufficient fluid is provided to operate the steering booster while the vehicle is being spotted in proper position at the discharge station, an auxiliary valve being also provided to connect the total output of the pump to the fluid motor operating the discharge section when the vehicle is in proper discharge position, so that elevation of the discharge section may be completed with the full output from the hydraulic pump.

It is a principal object of this invention to provide for more efficient positioning of a mine haulage vehicle at a discharge station, and in such a fashion that power steering may be had while the discharge section thereof is being elevated.

A second object is to provide in a mine haulage vehicle effective proportioning of the pressure fluid operating the steering booster and the discharge section so that both functions may be carried on simultaneously if desired.

Other objects and important features of the invention will become apparent from a study of the within specification taken with the drawing which together show a preferred embodiment of the invention and what is now considered to be the best mode of practicing the principles thereof. Other embodiments of the invention will be suggested to those having the benefit of the teachings of the within specification, and it is not intended that the invention be limited by the precise embodiment disclosed herein, nor otherwise than by the scope and breadth of the appended claims.

In the drawings:

Fig. 1 is a schematic diagram illustrating a hydraulic system for a mine haulage vehicle embodying the invention herein; and Fig. 2 is a schematic diagram illustrating the discharge section in position overlying a belt conveyor for discharge of the contents of the haulage vehicle onto the belt conveyor.

Referring now to the drawing, the improvement according to the present invention may be considered to be embraced within a mine haulage vehicle of the type as is disclosed in Beck Patent No. 2,336,386, issued December 7, 1943, and several improvement patents thereof. In describing the invention herein, only those portions of such a mine haulage vehicle will be adverted to as may be necessary completely to understand the nature and principles of this invention, and such a mine haulage vehicle may consist among other things of a vehicle bed 11 and a discharge section 12 adapted to be supported on a side frame 13 which is pivotable with respect to a center 14 located on the vehicle. A flight conveyor 16 is adapted to move longitudinally of the bed 11 and discharge section 12, and is trained around end drums 17 and 18 of the haulage vehicle so that the contents may be removed from the bed 11 and the discharge section 12.

The mine haulage vehicle is provided with a steering booster 19 which may be connected in any suitable manner to a steering linkage 21 of the vehicle. The precise form of the steering booster 19 forms no part of the present invention except insofar as it may be claimed in the combination herein.

The discharge section 12 of the vehicle is adapted to be raised to a position of discharge, as seen in Fig. 2, in overlying relationship with respect to a belt conveyor 22 or other type of conveying means at a discharge station of the haulage vehicle. The discharge section 12 is raised by a fluid motor 23 having a piston rod 24 pivotally anchored at 26 to the side frame 13. The fluid motor 23 is pivotally anchored as at 27 to any suitable part of the haulage vehicle, so that the fluid motor 23 and the piston rod 24 may rock as necessary in the raising or lowering of the discharge section 12.

As seen more particularly in Fig. 1, the steering booster 19 and the fluid motor 23 are supplied with pressure fluid from a pump 28 having an intake line 29 from a supply tank 31. The pump 28 pumps fluid under pressure by means of a pressure line 32 to a control valve 33 having an actuator 34 controlling the admission of pressure fluid by a line 36 to the fluid motor 23 so as to raise the discharge section 12 when desired. During normal tramming operation of the vehicle the actuator 34 of the control valve 33 is in position so that pressure fluid is supplied through the control valve 33 to a pressure line 37, having a check valve 38 therein, connected to the steering booster 19, the fluid from the steering booster 19 being exhausted to the tank 31 by a tank line 39. Pressure fluid is released from the fluid motor 23 by a tank line 40.

The raising of the discharge section 12 by the fluid motor 23 requires substantially the entire output of the pump 28 so that insufficient pressure fluid is available for the steering booster 19. While such a condition is of no importance once the vehicle is in proper position at the discharge station, the operation of both the steering booster 19 and the fluid motor 23 is necessary in spotting the vehicle in the position shown in Fig. 2, or for raising the discharge section prior to reaching the discharge station. In order to make sufficient fluid pressure available for both the fluid motor 23 and the steering booster 19 in spotting the vehicle properly, the pressure fluid from the pump 28 is proportioned so that a sufficient volume of fluid at proper pressure is available for each. To this end a branching pressure line 41 is connected to the pressure line 32 and a flow regulator 42, indicated generally by the reference numeral 43, is connected in the line 41 along with a shut-off valve 43, the other end of the branching pressure line being connected to the pressure line 37 to steering booster 19 in between the check valve 38 and the steering booster 19.

When the valve 43 is in the "on" position as shown the pressure fluid from the pump 28 is proportioned between the pressure lines 32 and 41 by the flow regulator 42. Said flow regulator consists of a generally cylindrical body member 44 having coaxial bores 46 and 47 therein separated by a partition 48 having a small bleed opening 49 therein. The body member 44 is reduced in outside diameter to define an annular wall 51 provided with radial passageways 52 to the bore 46 and radial passageways 53 to the bore 47. The body member 44 is also provided with an external shoulder 54 which is abutted by a sleeve 56 closely fitting the body member 44 and an O-ring seal 58 to define with the reduced outside diametered portion of the body member 44 an annular chamber 59 which thus provides communication between the bores 46 and 47. The sleeve 56 is held in position against the shoulder 54 by a snap ring 61 held in a groove 62 on the body member 44.

A hollow throttling member 63 is slidable within the bore 46 and is opposed in its movement by a calibrated spring 64 abutting the throttling member 63 at one end, the other end of the spring 64 abutting the partition 48. A C-ring 65 limits the movement of the throttling member 63 by the spring 64. The throttling member 63 has an end wall 66 with a metering opening 67 therein, and a skirt 68 of the throttling member 63 is provided with radial openings 69 which with the skirt 68 vary the effective opening of the radial passageways 52.

The flow of pressure fluid through the pressure regulator 42 creates a pressure differential across the metering opening 67 which is opposed by the calibrated spring 64, and when equilibrium is reached, the passageways 52 are throttled to provide uniform flow through the regulator 42. It will be apparent, of course, that for a desired flow through the metering opening 67, assuming substantially constant pressure and volume from the pump 28, the throttling member 63 will vary in its position of throttling of the passageways 52.

With the valve 43 in the "on" position, and the actuator 34 operated to supply pressure fluid to the fluid motor 23, the throttling member 63 will move as required to vary the opening of the radial openings to continue to supply a desired flow of pressure fluid to the steering booster 19. When combined operation of both the fluid motor and the steering booster 19 is no longer needed, once the haulage vehicle is properly positioned as seen in Fig. 2, the valve 43 is closed and all of the pressure fluid is effective to elevate the discharge section 12. When the actuator 34 is operated to release the fluid from the motor 23 to tank by the line 40, full pressure is again available to the steering booster 19, irrespective of the condition of the valve 43, for tramming.

It will be apparent from the foregoing description that both tramming and raising of the discharge section may be achieved during spotting of the vehicle without the necessity of providing additional pump output. During tramming, the single pump is entirely adequate for operation of the steering booster, and during raising the same pump is also entirely adequate. By providing for controlled proportioning of the pressure fluid during simultaneous tramming and raising, the output from a single pump is also entirely adequate.

While the invention is described in terms of a preferred embodiment thereof it is intended that the scope of the invention be limited only by the terms of the claims here appended.

I claim:

1. In a mine haulage vehicle having a discharge section including a fluid motor for elevating said discharge section into position at a discharge station, a steering apparatus including a fluid operated booster for said steering apparatus, an hydraulic system including a pump and a control valve for supplying pressure fluid to said fluid motor and said steering booster, said control valve being normally in a position to pass pressure fluid therethrough for said steering booster and at times being operable to supply pressure fluid to said fluid motor, means for proportioning the output of pressure fluid from said pump so that sufficient pressure fluid is supplied to said steering booster comprising a branching pressure line connecting said pump to said steering booster, said means including means located in said branching line and responsive to the flow of pressure fluid from said pump for regulating the flow of pressure fluid in said branching line.

2. In a mine haulage vehicle having a discharge section including a fluid motor for elevating said discharge section into position at a discharge station, a steering apparatus including a fluid operated booster for said steering apparatus, an hydraulic system including a pump and a control valve for supplying pressure fluid to said fluid motor and said steering booster, said control valve being normally in a position to pass pressure fluid therethrough for said steering booster and at times being operable to supply pressure fluid to said fluid motor, means for proportioning the output of pressure fluid from said pump so that sufficient pressure fluid is supplied to said steering booster comprising a branching pressure line connecting said pump to said steering booster, and a valve connected in said branch line for causing all of the pressure fluid to flow to said control valve when it is desired to operate said fluid motor independently of said steering booster.

3. In a mine haulage vehicle having a discharge section including a fluid motor for elevating said discharge section into position at a discharge station, a steering apparatus including a fluid operated booster for said steering apparatus, an hydraulic system including a pump and a control valve for supplying pressure fluid to said fluid motor and said steering booster, said control valve being normally in a position to pass pressure fluid therethrough for said steering booster and at times being operable to supply pressure fluid to said fluid motor, means for proportioning the output of pressure fluid from said pump so that sufficient pressure fluid is supplied to said steering booster comprising a branching pressure line connecting said pump to said steering booster, said means including a flow responsive device connected in said branching line, said flow responsive device including a movable throttling member and an orifice in said throttling member for causing said throttling member to move in response to the drop in pressure across said orifice to regulate the flow of pressure fluid in said branching line.

4. In a mine haulage vehicle having a discharge section including a fluid motor for elevating said discharge section into position at a discharge station, a steering apparatus including a fluid operated booster for said steering apparatus, an hydraulic system including a pump and a control valve for supplying pressure fluid to said fluid motor and said steering booster, said control valve being normally in a position to pass pressure fluid therethrough for said steering booster and at times being operable to supply pressure fluid to said fluid motor, means for proportioning the output of pressure fluid from said pump so that sufficient pressure fluid is supplied to said steering booster comprising a branching pressure line connecting said pump to said steering booster, said means including a flow responsive device connected in said branching line, said flow responsive device including a movable throttling member and an orifice in said throttling member for causing said throttling member to move in response to the drop in pressure across said orifice to regulate the flow of pressure fluid in said branching line, and a valve connected in said branch line for causing all of the pressure fluid to flow to said control valve when it is desired to operate said fluid motor independently of said steering booster.

5. In a mine haulage vehicle having a discharge section including a fluid motor requiring a relatively large volume of pressure fluid for operation thereof to elevate said discharge section into position at a discharge station, a steering apparatus including a fluid operated booster requiring a relatively low volume of pressure fluid for operation thereof, an hydraulic system including a pump and a control valve for supplying pressure fluid to said fluid motor and said steering booster, said control valve being normally in position to pass pressure fluid therethrough for operation of said steering booster and at times being operable to supply pressure fluid to said fluid motor; the combination therein of means for insuring the supply of sufficient pressure fluid to said steering booster upon operation of said fluid motor comprising a branching pressure line connected at one end to the output of said pump and connected at its other end at a point intermediate said control valve and said steering booster, said means including means located in said branching pressure line and responsive to the flow of pressure fluid from said pump for regulating the flow of pressure fluid in said branching line.

6. In a mine haulage vehicle having a discharge section including a fluid motor requiring a relatively large volume of pressure fluid for operation thereof to elevate said discharge section into position at a discharge station, a steering apparatus including a fluid operated booster requiring a relatively low volume of pressure fluid for operation thereof, an hydraulic system including a pump and a control valve for supplying pressure fluid to said fluid motor and said steering booster, said control valve being normally in position to pass pressure fluid therethrough for operation of said steering booster and at times being operable to supply pressure fluid to said fluid motor; the combination therein of means for insuring the supply of sufficient pressure fluid to said steering booster upon operation of said fluid motor comprising a branching pressure line connected at one end to the output of said pump and connected at its other end at a point intermediate said control valve and said steering booster, and a valve connected in said branching pressure line for causing all of the pressure fluid to flow to said control valve when it is desired to operate said fluid motor independently of said steering booster.

7. In a mine haulage vehicle having a discharge section including a fluid motor requiring a relatively large volume of pressure fluid for operation thereof to elevate said discharge section into position at a discharge station, a steering apparatus including a fluid operated booster requiring a relatively low volume of pressure fluid for operation thereof, an hydraulic system including a pump and a control valve for supplying pressure fluid to said fluid motor and said steering booster, said control valve being normally in position to pass pressure fluid therethrough for operation of said steering booster and at times being operable to supply pressure fluid to said fluid motor; the combination therein of means for insuring the supply of sufficient pressure fluid to said steering booster upon operation of said fluid motor comprising a branching pressure line connected at one end to the output of said pump and connected at its other end at a point intermediate said control valve and said steering booster, said means including a flow responsive device connected in said branching pressure line, said flow responsive device including a movable throttling member and an orifice in said throttling member for causing said throttling member to move in response to the drop in pressure across said orifice to regulate the flow of pressure fluid in said branching pressure line.

8. In a mine haulage vehicle having a discharge section including a fluid motor requiring a relatively large volume of pressure fluid for operation thereof to elevate said discharge section into position at a discharge station, a steering apparatus including a fluid operated booster requiring a relatively low volume of pressure fluid for operation thereof, an hydraulic system including a pump and a control valve for supplying pressure fluid to said fluid motor and said steering booster, said control valve being normally in position to pass pressure fluid therethrough for operation of said steering booster and at times being operable to supply pressure fluid to said fluid motor; the combination therein of means for insuring the supply of sufficient pressure fluid to said steering booster upon operation of said fluid motor comprising a branching pressure line connected at one end to the output of said pump and connected at its other end at a point intermediate said control valve and said steering booster, said means including a flow responsive device connected in said branching pressure line, said flow responsive device including a movable throttling member and an orifice in said throttling member for causing said throttling member to move in response to the drop in pressure across said orifice to regulate the flow of pressure fluid in said branching pressure line, and a valve connected in said branching pressure line for causing all of the pressure fluid to flow to said control valve when it is desired to operate said fluid motor independently of said steering booster.

JOSEPH J. SLOMER.

References Cited in the file of this patent

UNITED STATES PATENTS

| Number | Name | Date |
|---|---|---|
| 2,266,921 | Trautman | Dec. 23, 1941 |
| 2,325,731 | Arentzen et al. | Aug. 3, 1943 |
| 2,359,889 | Bigelow | Oct. 10, 1944 |
| 2,467,576 | Zimmerman | Apr. 19, 1949 |
| 2,538,143 | Brown | Jan. 16, 1951 |